United States Patent
Muakkit et al.

(10) Patent No.: US 10,128,968 B2
(45) Date of Patent: Nov. 13, 2018

(54) SATELLITE DOWNLINK SIGNAL PERFORMANCE MONITORING AT IDENTIFIED ANTENNAS

(71) Applicant: Flyaway Antennas, LLC, Chandler, AZ (US)

(72) Inventors: Zuhair Muakkit, Tempe, AZ (US); Kevin M. O'Neil, Chandler, AZ (US)

(73) Assignee: FLYAWAY ANTENNAS, LLC, Chandler, AZ (US)

( * ) Notice: Subject to any disclaimer, the term of this patent is extended or adjusted under 35 U.S.C. 154(b) by 0 days.

(21) Appl. No.: 15/811,886

(22) Filed: Nov. 14, 2017

(65) Prior Publication Data

US 2018/0069642 A1    Mar. 8, 2018

Related U.S. Application Data

(63) Continuation of application No. 15/042,980, filed on Feb. 12, 2016, now Pat. No. 9,853,754.

(60) Provisional application No. 62/115,500, filed on Feb. 12, 2015.

(51) Int. Cl.
  H04B 7/185    (2006.01)
  H04B 17/40    (2015.01)
  H04B 17/18    (2015.01)

(52) U.S. Cl.
  CPC ......... H04B 17/40 (2015.01); H04B 7/18517 (2013.01); H04B 7/18519 (2013.01); H04B 17/18 (2015.01)

(58) Field of Classification Search
  CPC .. H04B 3/46; H04B 7/18519; H04B 7/18517; H04B 17/00; H04B 17/23; H04B 17/11; H04B 17/15; H04B 17/18
  USPC .......... 455/67.14, 67.11, 12.1, 3.02
  See application file for complete search history.

(56) References Cited

U.S. PATENT DOCUMENTS

| | | | |
|---|---|---|---|
| 6,362,772 B1 * | 3/2002 | Skotch | H04B 7/18519 340/501 |
| 6,937,952 B2 * | 8/2005 | Buckshaw | H04B 7/18513 324/76.19 |
| 9,853,754 B1 * | 12/2017 | Muakkit | H04B 17/40 455/12.1 |

(Continued)

OTHER PUBLICATIONS

USPTO; Non-Final Office Action dated Dec. 2, 2016 in U.S. Appl. No. 15/042,980.

(Continued)

*Primary Examiner* — Philip Sobutka
(74) *Attorney, Agent, or Firm* — Snell & Wilmer L.L.P.

(57) ABSTRACT

A satellite monitoring system is disclosed. The system may monitor various downlink signals of various satellites. In response to user queries, the system may provide diagnostic and other data related to the characteristics of the downlink signals. In this manner, an independent verification and validation of downlink signal characteristics may be performed. Moreover, the system may take various actions in response to detected anomalies related to the characteristics of the downlink signals, such as automatically generating alerts for users and/or activating an uplink facility, such as a backup uplink facility and/or providing control signals to user devices, such as antenna controllers, to reorient user antennas in response to the characteristics of the downlink signals.

20 Claims, 13 Drawing Sheets

(56) References Cited

U.S. PATENT DOCUMENTS

2004/0068365 A1* 4/2004 Sanchez Peiro ... H04B 7/18597
                                                    455/423
2014/0294052 A1* 10/2014 Currivan ................ H04B 3/46
                                                    375/224

OTHER PUBLICATIONS

USPTO; Final Office Action dated May 23, 2017 in U.S. Appl. No. 15/042,980.
USPTO; Notice of Allowance dated Aug. 15, 2017 in U.S. Appl. No. 15/042,980.

* cited by examiner

SATELLITE DOWNLINK SIGNAL PERFORMANCE MONITORING AT IDENTIFIED ANTENNAS

CROSS-REFERENCE TO RELATED APPLICATION

This application is a continuation of U.S. patent application Ser. No. 15/042,980, now entitled "SATELLITE DOWNLINK SIGNAL PERFORMANCE MONITORING AT IDENTIFIED ANTENNAS," filed Feb. 12, 2016. The '980 U.S. patent application claims priority to U.S. Provisional Application No. 62/115,500, entitled "SATELLITE PERFORMANCE MONITORING SYSTEM AND METHOD," filed Feb. 12, 2015, and which is incorporated herein by reference.

TECHNICAL FIELD

The present disclosure relates to satellite communication systems, and in particular to systems and methods for determining downlink signal characteristics for satellite communication systems.

BACKGROUND

Satellite communications is a communication medium with a significant numbers of users. For example, broadcast networks use satellite communication technologies to broadcast their programs, such as television shows. Journalists and news programs also use satellite communication technologies to distribute programs. Satellite communication technologies are used by corporations to connect offices together. Moreover, the wireless nature of satellite communication technology makes it desirable for communication with oceangoing and remotely disposed locations, such as oilrigs, indigenous communities, seafaring vessels and the like. As such, robust and reliable satellite communication proves essential to both business interests and to health and humanitarian concerns. Because such communications are increasingly critical to myriad users, there is a need for a mechanism whereby users may check and monitor the condition of signals emanating from satellites and in different satellite spectrums.

Previous efforts to address these considerations include acquisition of costly and complex antenna and spectrum analysis equipment. For users with multiple satellite downlinks to monitor, the scaling cost of acquiring multiple antennas and/or movable antenna become significant. Moreover, mechanisms for reporting data from the spectrum analysis equipment to stakeholders, such as decision makers, proves difficult, such as requiring a remote field technician to capture and manually transmit photographs of spectrum analyzer screens.

SUMMARY

A satellite monitoring system is disclosed. The system may include an antenna configured to receive a downlink signal from a satellite, a receiver including a spectrum analyzer logically connected to the antenna, and a server logically connected to the receiver and a database. The server may include a data driven decision module whereby the downlink signal may be assessed and a user response module configured to transmit a server response according to a server response format including characteristics of the downlink signal.

A method of satellite monitoring is disclosed. The method may include receiving, by a user response module of a server, a user query, initiating, by a data driven decision module of the server, a response including requesting that a server response module of the server obtain data related to a downlink from a satellites, and directing, by the data driven decision module of the server, a user response module of the server to transmit a server response.

BRIEF DESCRIPTION OF THE DRAWINGS

With reference to the following description, appended claims, and accompanying drawings:

DETAILED DESCRIPTION

Figure 1:
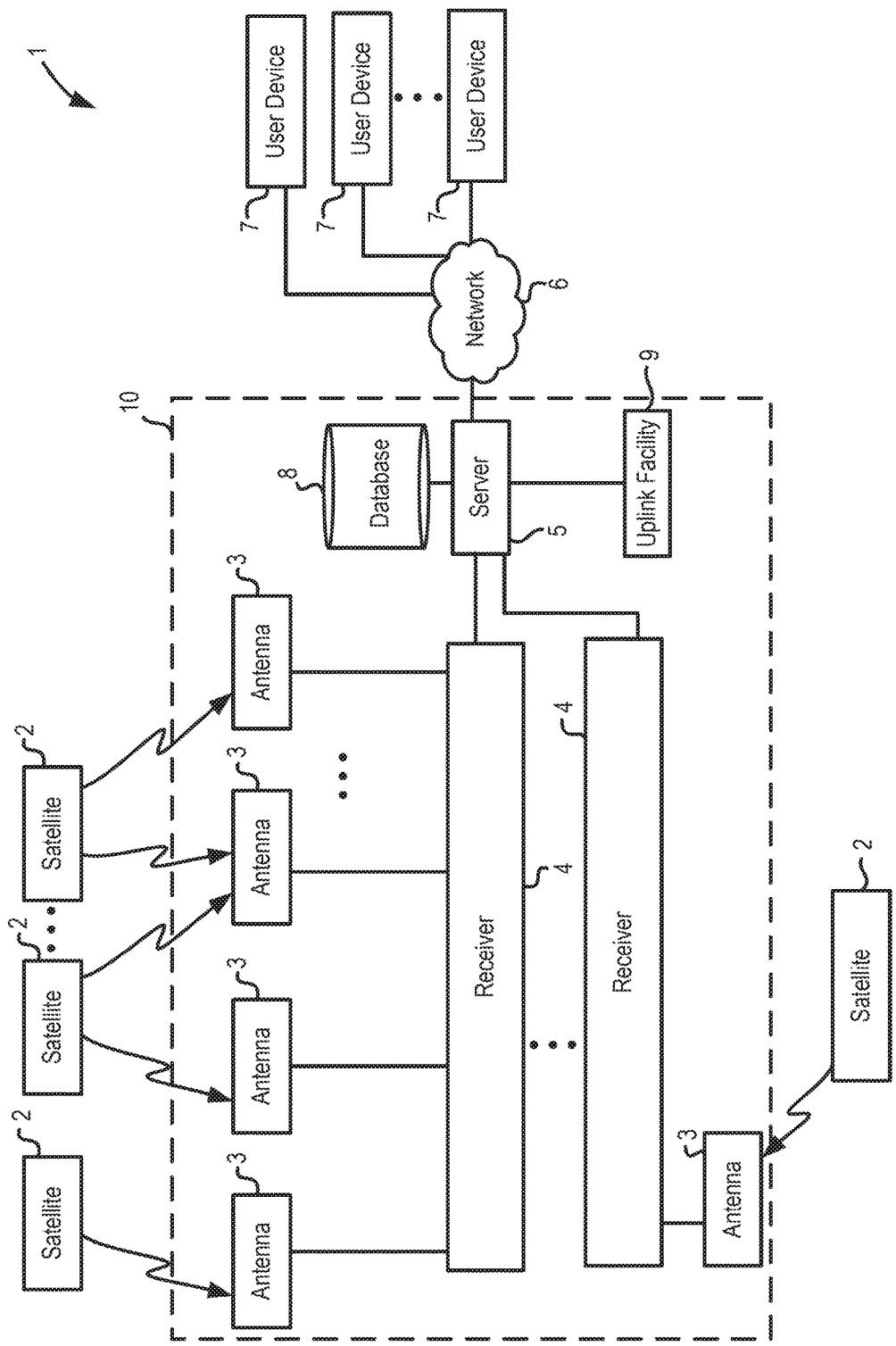
FIG. 1 depicts a satellite communications monitoring scenario including a satellite monitoring system, according to various embodiments.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from the scope of the appended claims.

For the sake of brevity, conventional techniques for computer network design and RF demodulation may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical implementation.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, phrases such as "make contact with," "coupled to," "touch," "interface with" and "engage" may be used interchangeably. As used herein, "logical communication" or "logical connection" may refer to any method by which information may be conveyed. Logical communication may facilitate the transmission of signals, whether analog or digital, between two or more components. Thus, "logical communication" may refer to any electrical, electromagnetic, radiofrequency and/or optical method whereby information may be conveyed.

In accordance with principles of the present disclosure, a satellite monitoring system may provide various features. For instance, a satellite monitoring system may enable spectrum monitoring of any satellite at any frequency from anywhere in the world, may provide spectrum plots to any satellite in a real-time or substantially real-time fashion, may interpret user-provided spectrum plots and/or related data such as to identify particular satellite(s), and/or may monitor any certain satellite carrier for any abnormality and report back to a user. A spectrum analyzer may be a device for analyzing the magnitude of a signal versus frequency over a range of frequencies.

The systems and methods disclosed herein enable users to monitor and view satellite signals using devices that may lack satellite antennas or a spectrum analyzer attached to them. Spectrum analysis may be conducted remotely from the user and transmitted to the user for further use, for example. The methods and systems herein may thus serve as a cloud spectrum analyzer, decentralized spectrum analyzer, spectrum analyzer in space, or web spectrum analyzer.

Moreover, a satellite monitoring system may lock to video signals and provide a snapshot or continuous picture back to a user and/or may record spectrum plots (e.g., Bode plots) of one, many, or all satellites for any period of time for later review by a user.

The satellite monitoring system may interact with a user, enhancing user awareness of satellite operating conditions, such as by calling, emailing, or SMS/MMS messaging the user, and may provide the user with an outside (e.g., third-party) verification of the status of downlink carriers, such as for troubleshooting.

A satellite monitoring system may include a complete antenna reception system, such as an antenna dedicated to each satellite frequency band to continuously monitor that satellite frequency band. Each antenna may be fitted with needed feed/OMT/LNA/LNB to properly acquire the needed signal. The system may also include cabling. Cables are used to bring all signals acquired into a multiport spectrum analyzer. Suitable cables include, for example, fiber optic cables, coaxial cables, or other cables suitable for carrying an electronic or optical signal. The system may include one or more spectrum analyzer(s). The spectrum analyzer(s) receive all signals from the installed antennas and process them. The satellite monitoring system may further include a server, e.g., a computer that interrogates the spectrum analyzer(s) and collects all monitored signals data.

In various embodiments, the system includes receiver(s) configured to lock to signals and provide relevant information about the content and health of a certain signal (carrier) on any satellite. A receiver may be included in or may be separate from a spectrum analyzer. Finally, a satellite monitoring system may include software residing in the server and processing data collected from spectrum analyzer(s). The software interfaces with other web resources to provide users with a fast and efficient access to the spectrum information. The satellite monitoring system may be scaled, such as by being replicated in various different geographic areas, or by adding a plurality of spectrum analyzers and/or servers.

A user may interact with a satellite monitoring system in a variety of ways. For instance, users can interact with the satellite monitoring system through requests sent over a network, such as the internet. Users may access a website and/or console/terminal interface and monitor satellite signals. Users may SMS/MMS message the system with requests. Users may receive results returned by SMS/MMS. Users may call an automated system. Users may receive unsolicited alerts in response to previously set rules, such as SMS/MMS or phone call alerts of satellite behavior, such as signal anomalies, as desired. Finally, users may email requests about satellite signals and receive returned results.

Various mechanisms of user alert may be combined in various ways and/or with other system components that take automated actions. For instance, the satellite monitoring system may further trigger the initialization of a backup uplink system, such as when a satellite appears to not be receiving an uplink signal from a third-party uplink system. The satellite monitoring system may detect problems in any part of the satellite signal path, such as an uplink and/or downlink, and/or endpoint equipment and may provide user alert and/or trigger the initialization of a backup uplink system.

Thus, with reference to FIG. 1, and in accordance with various embodiments, a satellite communications monitoring scenario 1 is depicted. A satellite communications monitoring scenario 1 may include one or more satellite 2. Each satellite may receive a number of uplink signals and may broadcast the content of the uplink signal(s) via a number of downlink signals. A satellite monitoring system 10 may receive the downlink signal(s) from the satellite(s) 2 and may assess various aspects of the signal(s) 2 and may take various actions and may process various data in response to the assessing. For instance, the satellite monitoring system 10 may be in logical communication with one or more user device 7. The user device 7 may comprise an internet browser device, smartphone, telephone, console/terminal access device, and any other mechanism by which communications, such as packetized data, voice, and/or the like, may be sent and received. The satellite monitoring system 10 may send and receive various commands and alerts to each user device 7 in response to the assessing and/or may receive various user queries requesting actions in response to the assessing.

A network 6 may be disposed between the satellite monitoring system 10 and the user device(s) 7. Thus, the user device(s) 7 may be located remotely away from the satellite monitoring system 10, such as at geographically dispersed locations. In various embodiments, the network 6 may comprise any arrangement or mechanism whereby electronic communication is enabled. Thus, a network 6 may be any suitable communications network including the Internet, a radio network, for example, a supervisory control and data acquisition ("SCADA") network, a trunked radio network, a radio repeater system, or any communications mechanism or combination of communications mechanisms. In this regard, network 6 may be configured to receive data from satellite monitoring system 10 components and distribute that data to other components of the satellite monitoring system 10 and/or any entity or other network or component desired to utilize the data. Moreover, network 6 may be configured to facilitate the transmission and receipt of data among components of the satellite monitoring system 10 in substantially real time. In this regard, network 6 may be capable of and/or configured to facilitate real-time and/or substantially real time monitoring of satellite 2 downlink signals. In various embodiments, network 6 may include at least a portion of one or more antenna 3, receiver 4, server 5, database 8, and/or uplink facility 9. The network 6 may communicate by any combination of technologies. For example, the network 6 may comprise a wired network with wireless endpoints whereby the various components of the satellite monitoring system 10 communicate with the wired network.

A satellite 2 may comprise a communications satellite, such as a voice, image, video, and/or data communications satellite. In various embodiments, the satellite 2 receives earth-based uplink signals for relaying via downlinks. In further embodiments, the satellite 2 collects various data, such as imagery, scientific data, intelligence data, geological data, and/or any other data, and transmits downlinks independent of uplink data. Thus, a satellite may comprise any man-made orbital and/or sub-orbital and/or trans-orbital body configured to transmit signals.

Having discussed a satellite communications monitoring scenario 1, specific attention is directed to a satellite monitoring system 10. A satellite monitoring system 10 may comprise various components whereby satellite downlink signals are monitored and information is output to user devices 7 in response to at least one of the satellite downlink signal(s) and user query/queries regarding the same.

For instance, a satellite monitoring system 10 may comprise one or more antenna 3 in logical communication with a receiver 4. An antenna may comprise a dish antenna, or may comprise a Yagi antenna, or may comprise a log periodic antenna, or may comprise any antenna configured to receive satellite downlink signal(s). In various embodiments, the antenna may be tuned to receive C-band downlink signals, or Ku-band downlink signals, or downlink signals of any frequency, as desired. Moreover, antenna 3 may be a large multi-beam antenna, or may be a single beam antenna. Thus, any number of antennas, from one to many, may be implemented, as desired and depending on the antenna architectures.

The satellite monitoring system 10 may comprise one or more receiver 4 in logical communication with the antenna(s) 3. A receiver 4 may comprise a demodulator configured to decode and interpret a message and/or data conveyed on a carrier of a downlink signal. A receiver 4 may comprise a spectrum analyzer, such as to monitor the strength, modulation profile, and/or other characteristics of one or more downlink carrier of one or more satellite 2, as received at one or more antenna 3. In this manner, various actions may be taken in response, such as creation of a Bode plot of various downlink carriers.

The satellite monitoring system 10 may comprise one or more server 5 in logical communication with at least one of the receiver 4, a database 8, user device(s) 7, and optionally, an uplink facility 9. The server 5 may receive, transmit, store, and/or process various signals and/or data such as that transmitted among the various devices in logical communication with the server 5. For instance, as will be discussed further, the server 5 may receive a user query regarding a satellite 2, and may transmit to a user device 7 in response to the query, a Bode plot. Similarly, the server 5 may transmit data, store, and/or process data, such as for use later, or for use/interpretation by a user. For instance, the processor may synthesize data from one or more receiver 4 over time, and provide useful information for utilization by user(s) via user device(s) 7.

The satellite monitoring system 10 may comprise a database 8. The server 5 may store and/or retrieve previously stored data, such from a receiver 4 and/or from a user device 7 in database 8 for synthesization and/or other use at a later time. In further embodiments, all synthesization and/or use occurs in substantially real-time, or otherwise occurs with respect to data provided by the server 5, user device(s) 7, and/or from third-party components, so that the database 8 may be omitted.

Finally, the satellite monitoring system 10 may comprise an uplink facility 9. In various embodiments, an uplink facility 9 comprises an antenna and/or transmitter system whereby an uplink signal to a satellite 2 may be transmitted. For example, the server 5 may, in conjunction with the receiver 4, determine that a satellite 2 is not transmitting a particular downlink carrier. In response, an uplink facility 9 may be activated by the server 5 and may direct an uplink carrier to the affected satellite 2. The receiver 4 may monitor the satellite downlink to determine whether the uplink carrier transmitted by the uplink facility 9 is being properly downlinked by the satellite 2. Moreover, in the event that a third-party uplink facility fails, the uplink facility 9 may be activated by the server 5 such as in response to the disappearance and/or weakening of an expected downlink carrier, to serve as a backup uplink facility.

In further embodiments, the uplink facility 9 may serve as a primary uplink facility, for instance, a user may engage the satellite monitoring system 10 to provide primary uplink capability, as well as to monitor the uplink/downlink carriers for various behavior as discussed herein. Furthermore, the server may monitor the signal(s) emanating from the uplink facility 9, such as to further detect anomalous behavior in the satellite 2, the uplink facility 9, and/or the channel whereby the user provides the data to be uplinked to the uplink facility 9. Thus, the various behavior discussed herein may similarly be applied to different portions of the uplink path as well.

Figure 5:
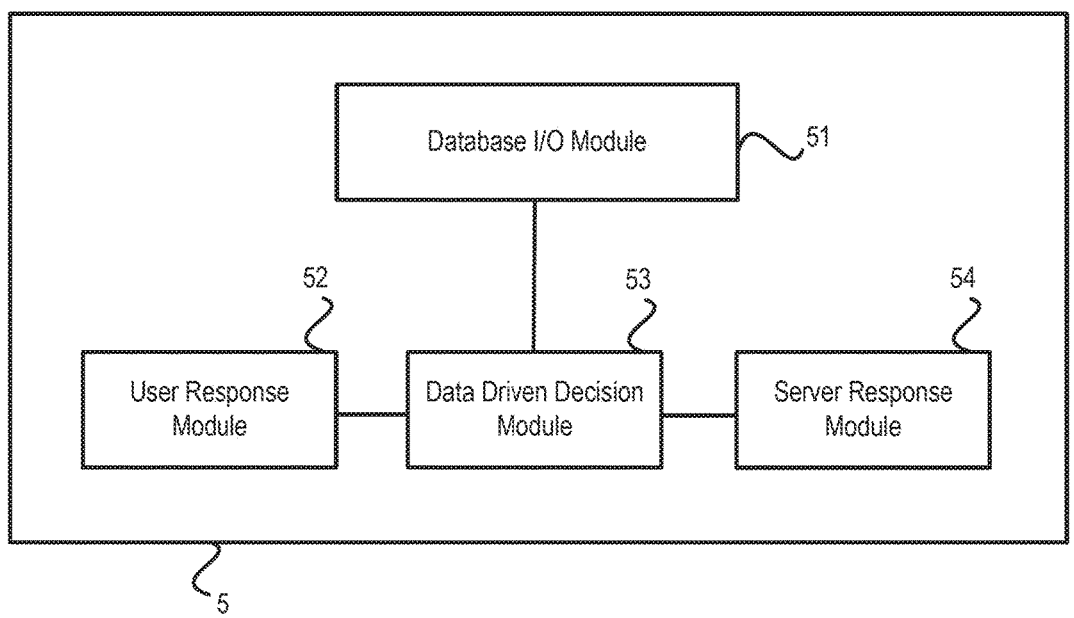
FIG. 5 depicts various aspects of a server of a satellite monitoring system, according to various embodiments.

As mentioned, the server 5 may take various actions. The server 5 may comprise various modules whereby the various actions are performed. With reference to FIG. 5, a server 5 may comprise a database I/O module 51, a user response module 52, a server response module 54, and a data driven decision module 53. The data driven decision module 53 may perform calculations and may instruct various other components of the server 5 to engage in tasks, and may instruct the database 8 to retain or retrieve data. The database I/O interface module 51 may direct the sending and receiving of data from database 8. The user response module 52 may direct the sending and receiving of data from user device(s) 7. The server response module 54 may direct the sending and receiving of data from other satellite monitoring system 10 system components, such as receiver(s) 4.

Figure 12:
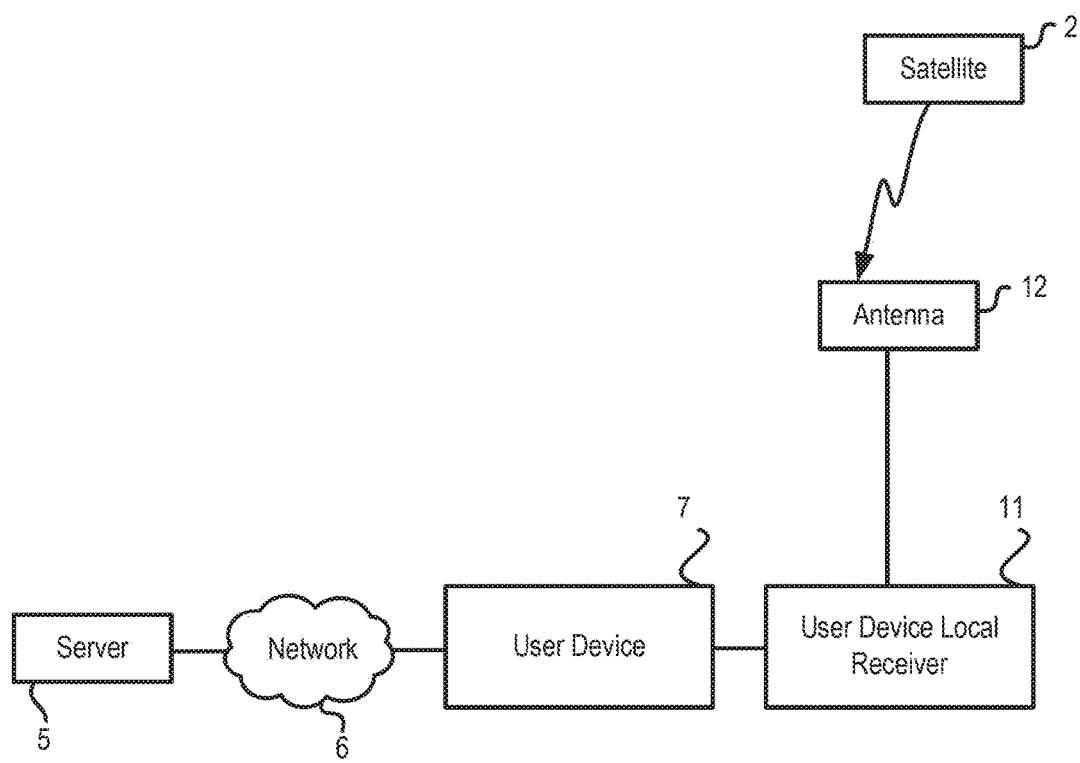
FIG. 12 depicts a user device in logical communication with a user device local receiver, in accordance with various embodiments.

With reference to FIG. 12, in various embodiments, a user device 7 may further comprise a user device local receiver 11. The user device local receiver 11 may comprise a dongle including a receiver comprising a spectrum analyzer. The user device local receiver 11 may be in logical communication with a local antenna 12, which may comprise a third-party user antenna discussed elsewhere herein, or may comprise an integrated antenna associated with the user device local receiver 11. The user device local receiver 11 may comprise, rather than a dongle, a device connected to a third-party user antenna and in logical communication directly to server 5 and/or via a user device 7. Thus, the user device local receiver 11 may additionally comprise a species of a user device 7. The user device local receiver 11 may be in logical communication with local antenna 12 which may be in receipt of a downlink signal from satellite(s) 2. The user device 7 may communicate with the server 5. The server 5 may compare the data collected by the user device local receiver 11 representing signals received from the satellite(s) 2 by the local antenna 12 to the data representing signals received from the satellite(s) 2 by the antenna(s) 3 and processed by the receiver(s) 4. The server 5 may perform a comparison of this data for display on the user device 7. In further embodiments, the server may compare the data collected by the user device local receiver 11 with data collected by other user device local receivers 11 (such as connected to other user devices 7) for display on the user device 7. In this manner, a user may compare characteristics of the downlink signal that the user is receiving with that received by other users, such as geographically nearby users as well as with that received by the satellite monitoring system 10. In various embodiments, the user device local receiver 11 may directly connect to a local antenna 12, or may be wirelessly connected in logical communication with a local antenna 12, such as a pre-existing third party user antenna discussed elsewhere herein. In various embodiments, a user device local receiver 11 may comprise a device that connects to a third-party user antenna such as by a wired signal splitter or a wireless logical connection, and display various data regarding received signals, such as a Bode plot, on a television or other video device. Moreover, the user device local receiver 11 may display a comparison with data provided by server 5, as well as geographically nearby users. Moreover, comparisons may be made with geographically remote users.

Figure 2:
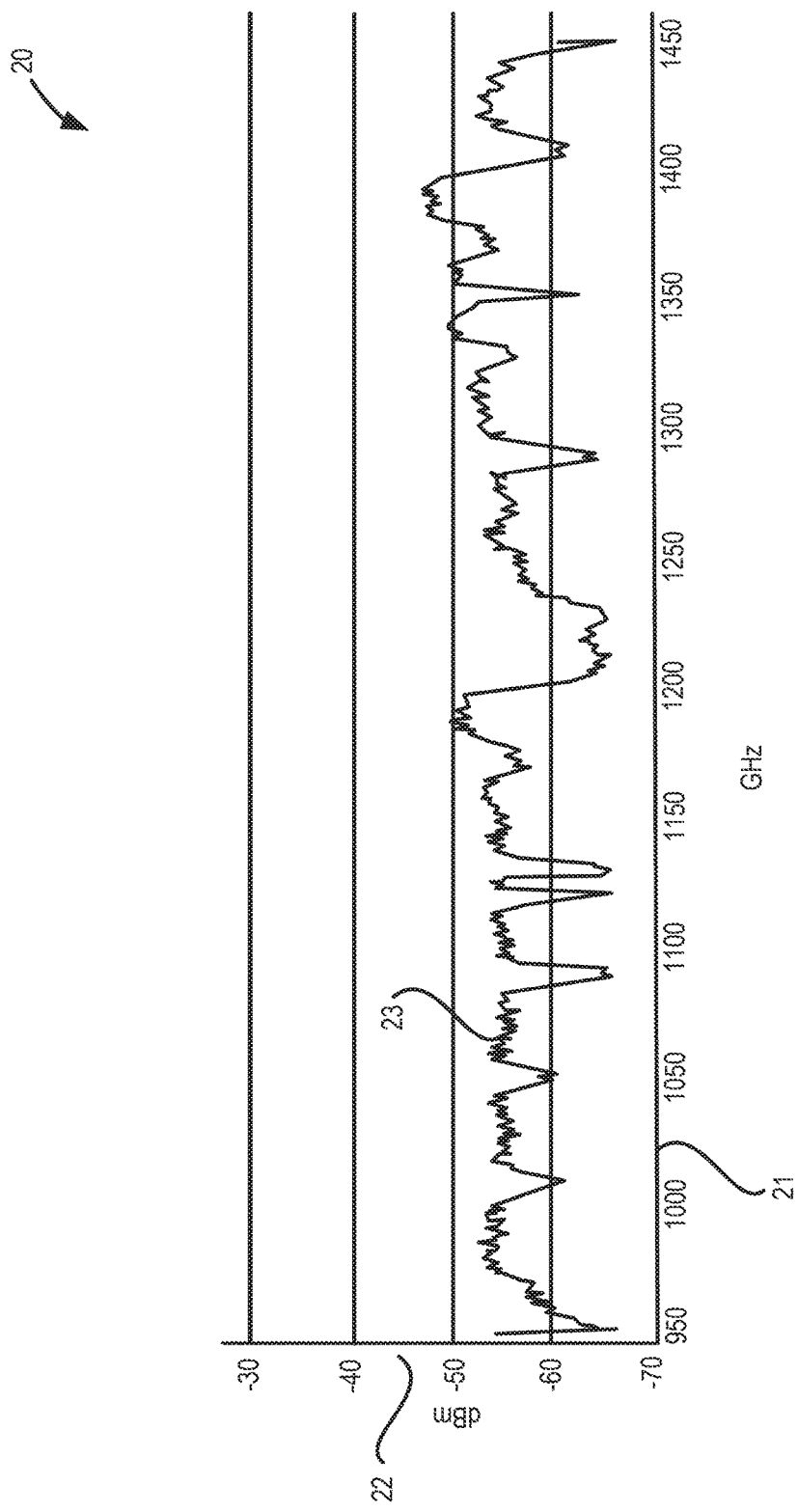
FIG. 2 depicts a downlink graph of a satellite monitoring system, according to various embodiments.

Having discussed various structural aspects of a satellite monitoring system 10, various methods of operation of the satellite monitoring system 10 in various scenarios are discussed. With reference to FIG. 2, in response to a user query (such as according to a user query format 30 (FIG. 3), the server 5 may generate a downlink graph 20 representative of the downlink signals received from the satellite(s) 2 by the antenna(s) 3 and processed by the receiver(s) 4. The downlink graph 20 may comprise a frequency axis 21 depicting a radio frequency of one or more downlink signals, and an amplitude axis 22 depicting the signal strength of the downlink signals along the frequency axis 21. A signal curve 23 may further be depicted, illustrating the frequency domain signal strength of the downlink signals received at antenna(s) 3. Thus, it may be said that the server may generate a server response according to a server response format 40 (FIG. 4) comprising a Bode plot format 42 (FIG. 4) in response to user query format 30 (FIG. 3).

Figure 3:
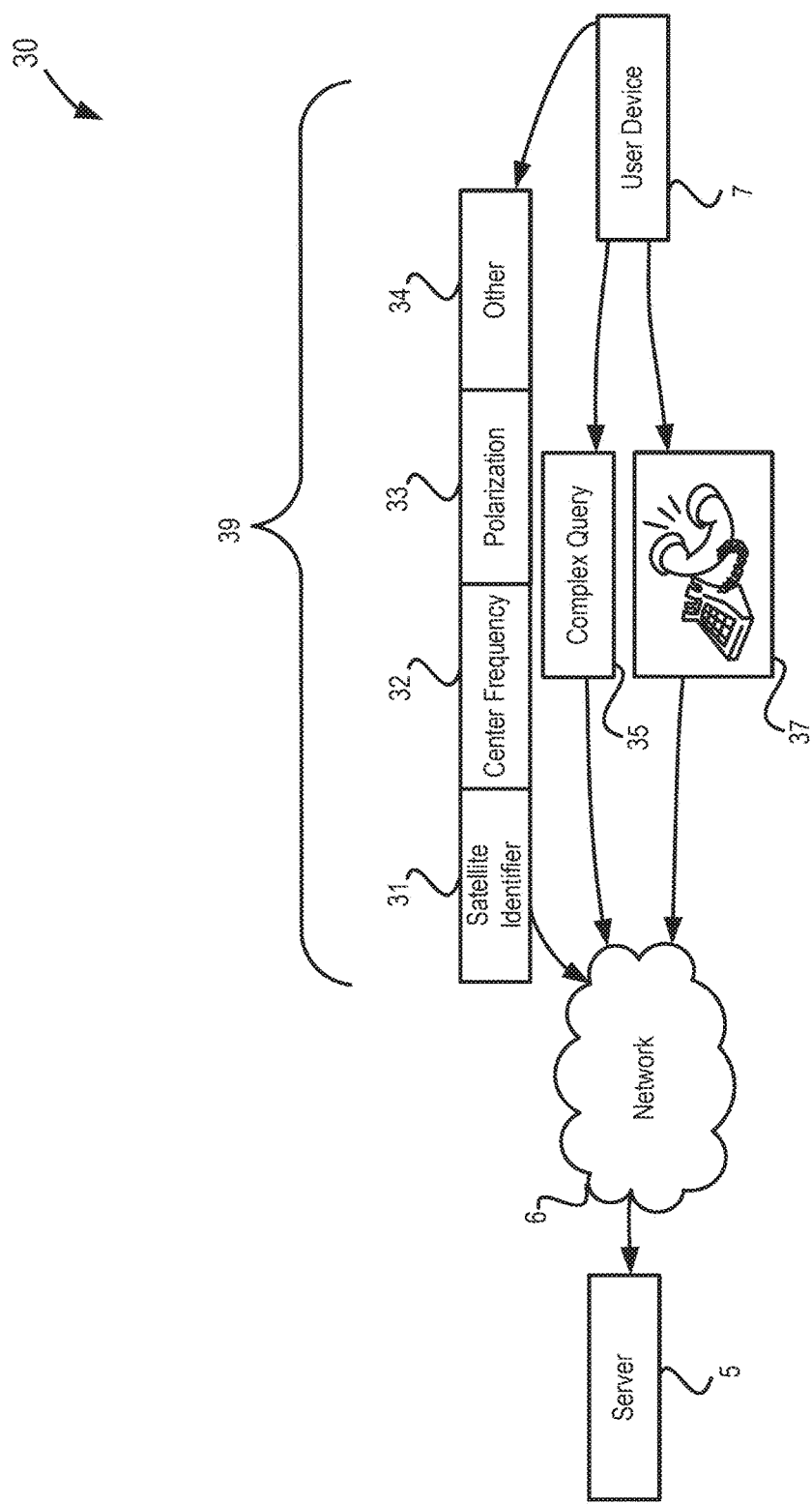
FIG. 3 depicts a user query format of a satellite monitoring system, according to various embodiments.
Figure 4:
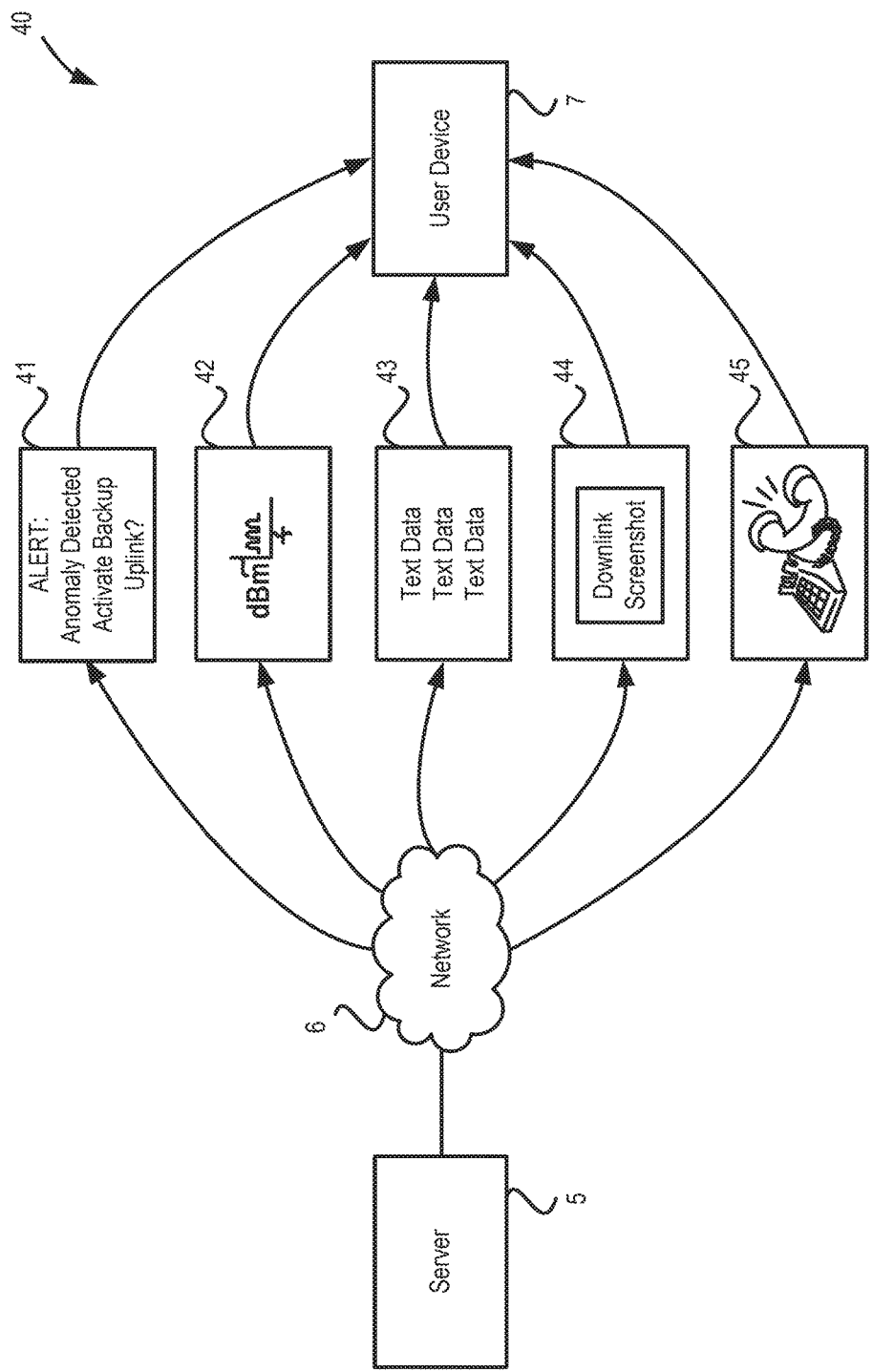
FIG. 4 depicts a server response format of a satellite monitoring system, according to various embodiments.

With reference to FIGS. 1, 3, and 4, a user may submit a query to the server 5. The user may send a query via a user device 7 to be received by a user response module 52 of a server 5. The data driven decision module 53 may take various actions in response to the query, such as sending a server response. The user's query may comprise one or more user query format 30. The data driven decision module 53 may direct the server response module 54 to send a server response that is responsive to the user query according to a server response format 40 (FIG. 4).

The server 5 may be responsive to queries from users that are formatted in various ways. For instance, a user query format 30 may comprise a text query format 39, a complex query format 35, a phone query format 37, and/or the like.

For example, a text query format 39 may comprise a particularly formatted text string. A user may send a user query with a text query format 39 from a user device 7 by SMS. The text query format 39 may comprise a satellite identifier 31, a center frequency query 32, a polarization query 33, and/or optionally may comprise another data query 34.

For instance, a text query format 39 may be as follows: "127 c h." Such a query may cause a data driven decision module 53 to collect a sample from antenna(s) 3 directed to a satellite longitude of 127 degrees ('127') of C-band downlinks ('c') from one or more satellite(s) 2 via antennas 3 having a horizontal polarization ('h'). The satellite identifier 31 may be a satellite location, name, orbit, and or the like. The center frequency query 32 may be any desired downlink frequency. The polarization query 33 may be any desired signal/antenna polarization, such as horizontal, vertical, right hand circular, left hand circular, and the like. The test query format 39 may cause the return of a sample having a predetermined bandwidth, such as 500 MHz.

In further embodiments, a text query format 39 may include an other data query 34, such as center frequency and bandwidth. For example, a test query format 39 may be as follows: "127 c h 2900 200." Such a query may cause a data driven decision module 53 to collect a sample from antenna(s) 3 directed to a satellite longitude of 127 degrees ('127') of C-band downlinks ('c') from one or more satellite(s) 2 via antennas 3 having a horizontal polarization ('h), the sample centered on 3900 MHz ('3900') and with a bandwidth of 200 MHz ('200').

Figure 10A:
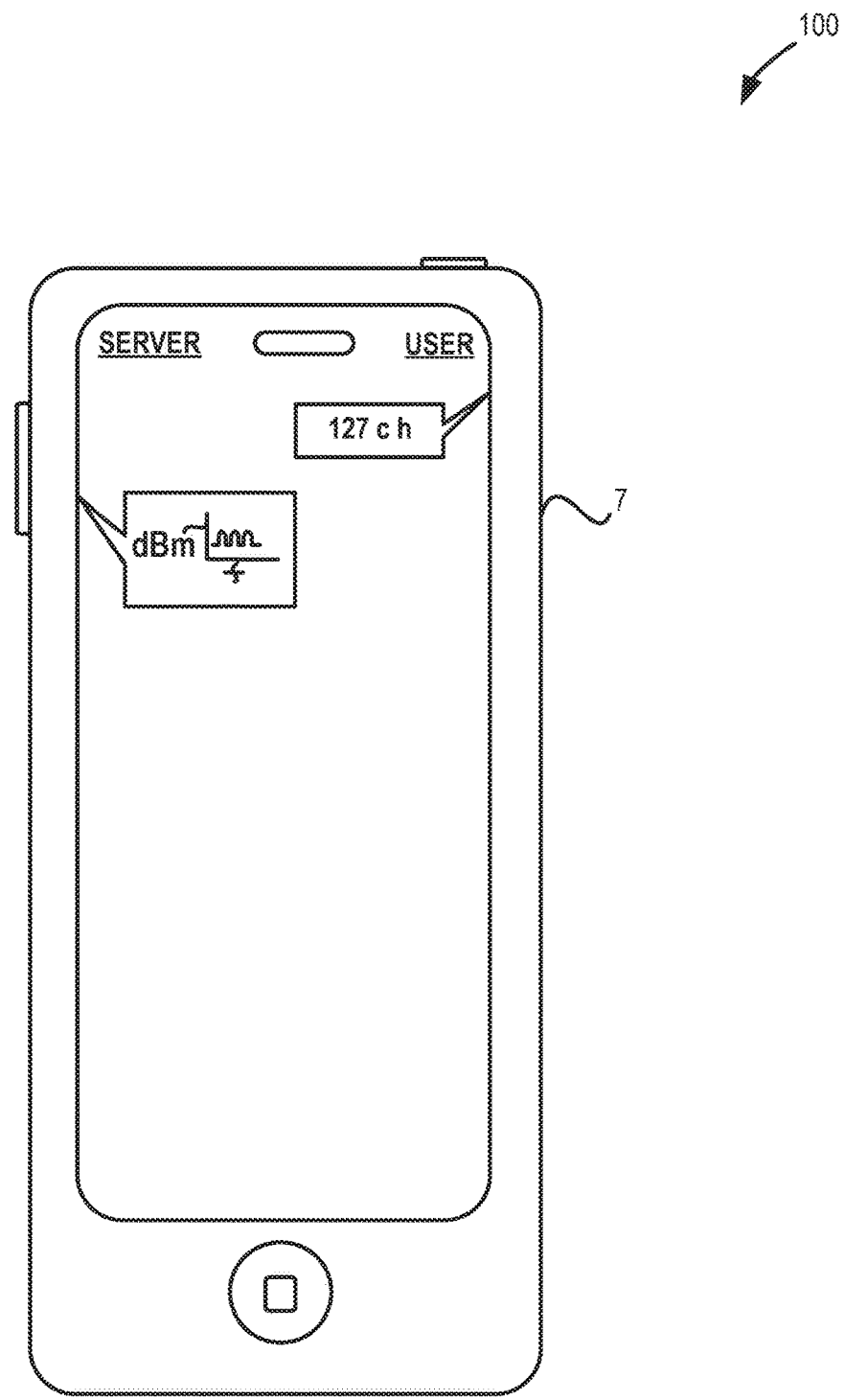
FIG. 10A depicts a user device display scenario of a satellite monitoring system, according to various embodiments.

FIG. 10A illustrates a user device display scenario 100 wherein the user submits a user query having a user query format 30 comprising a text query format 39 via a user device 7, and receives a server response having a server response format 40 (FIG. 4) comprising a Bode plot format 42 (FIG. 4). In various embodiments, the other data query 34 may also comprise other query components, such as to request a server response format 40 also comprising a screenshot format 44, or the like.

A complex query format 35 may comprise any instruction to the server 5, such as specific instructions to collect data regarding specific downlink(s) at specific frequencies, polarizations, bandwidths, and the like from specific satellite(s) 2. A complex query format 35 may comprise various instructions such as to directing a database I/O module 51 (FIG. 5) to store processing rules in a database 8, or to set alerts that may be triggered by signal anomalies, or to activate an uplink facility 9, and the like.

In various embodiments, a complex query format 35 may comprise a photograph of a spectrum analyzer display, such as a third-party spectrum analyzer also displaying satellite downlink(s). A complex query format 35 may further comprise a set of data points comprising similar data, such as a spreadsheet of amplitudes by frequency, and/or other formatted data and/or the like. For instance, a user may submit a photograph of a spectrum analyzer display by a complex query format 35, and the data drive decision module 53 may compare this to data to determine the identity of the satellite(s) displayed in the photograph of a spectrum analyzer display.

Moreover, a complex query format 35 may comprise data representing real-time signals received by a user device 7. For instance, a user device 7 may be an antenna controller and may submit a complex query format 35 comprising data representing real-time signals that it is receiving. The data driven decision module 53 may receive the user query formatted according to a complex query format 35 and may provide a server response having a server response format 40 comprising directions to the user device 7. The directions may instruct the user device 7 (e.g., antenna controller) to point a user's third-party antenna so that the user's third-party antenna may be automatically oriented to receive signals from a desired satellite. In this manner, a user device 7 may cause a user's third-party antenna to automatically point itself to properly receive a desired downlink and maintain orientation relative thereto.

As such, the satellite monitoring system 10 may be said to perform automated peaking. The satellite monitoring system 10 may direct a user device 7 comprising an antenna controller to cause a user's third-party antenna to turn right, left, upward, and downward, and any direction or to form a beam directed right, left, upward, or downward. For instance, a user device 7 may provide the server 5 with data representing the signals received at the third-party user antenna. The server 5 may compare this data to data representing signals received by the antenna(s) 3 and/or other user devices 7 and may direct a user device 7 to move an antenna or form a different beam form to improve the aim of that antenna relative to satellite(s) 2.

Furthermore, a complex query format 35 may comprise data requesting that a data driven decision module 53 scan all or some satellite downlinks to determine the type of carrier or carriers (data, voice, video, etc.) are present, as well as list channels and other data associated with carrier and/or determine whether new carrier(s) have recently manifested. The complex query format 35 may include rules requesting the user be alerted by the server 5 in the event of various changes in such data. For instance, a complex query format 35 may comprise a request to alert a specific user device 7 upon the detection of the broadcast of free-to-air (e.g., unencrypted, subscription-free) televisions or radio broadcasts and/or may comprise directions to automatically direct the user device 7 to orient an antenna to receive the associated downlink.

Still furthermore, a complex query format 35 may comprise data requesting that a data driven decision module 53 alert a user device 7 in the event that new downlink signals arise, such as unauthorized signals located in a frequency range reserved to a particular user having the user device 7.

A phone query format 37 may comprise any instruction to the server 5 provided by telephone. For instance, a user may use a user device 7 to call a satellite monitoring system 10 customer service representative and direct the representative to submit user queries to the satellite monitoring system 10, or may involve an automated phone system, such as may be voice activated or touch-tone activated.

Figure 10B:
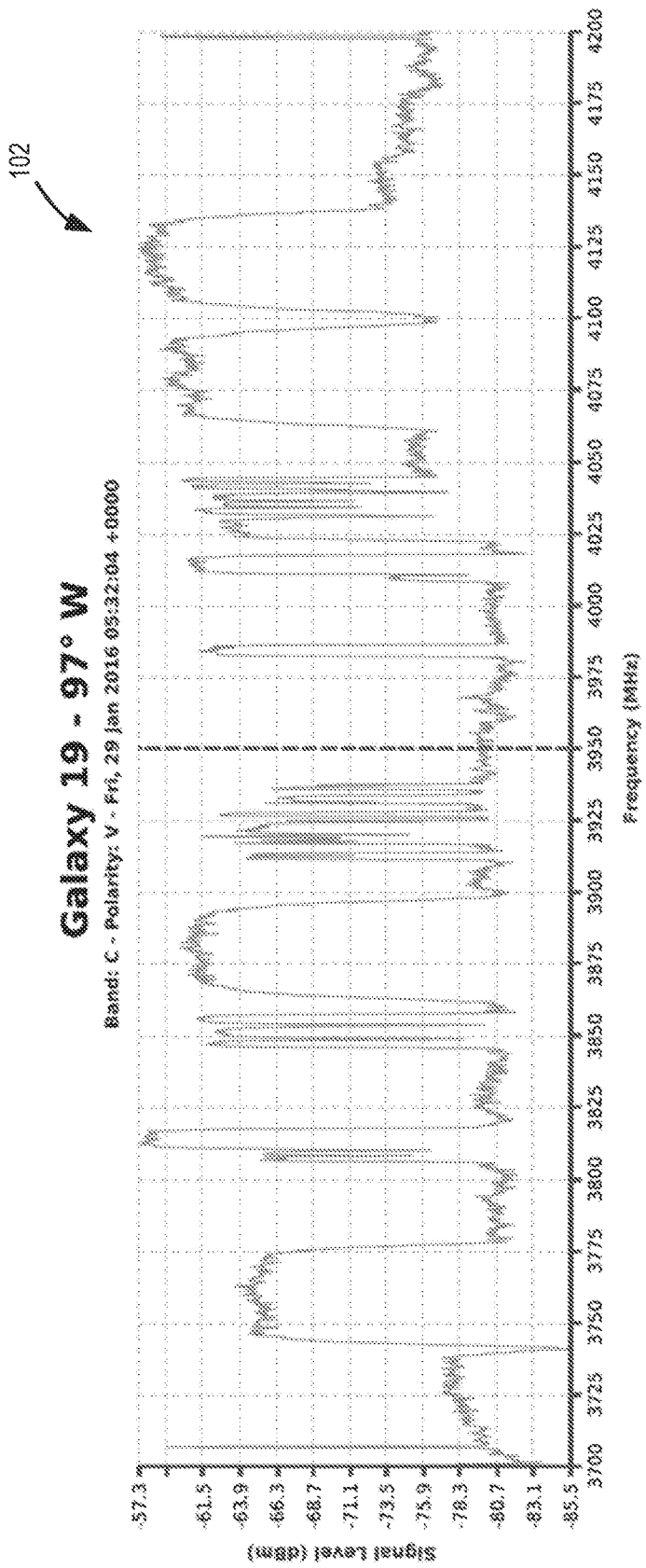
FIG. 10B depicts an exemplary spectrum analysis chart, according to various embodiments.

FIG. 10B illustrates a spectrum analysis chart 102 that may be presented to a user via user device 7. Spectrum analysis chart 102 plots signal level (i.e., amplitude) in decibels across a range of frequencies. The frequencies in spectrum analysis chart 102 range from 3700 MHz to 4200 MHz, although other frequency ranges may be selected based on the signal characteristics of the signal from satellite 2 to be analyzed. Spectrum analysis chart 102 may be created based on parameters passed using user query formats 30. For example, in FIG. 10B the spectrum analysis chart 102 corresponds to the satellite named Galaxy 19 at 97° W, on band C, with polarity V, as measured on Friday, Jan. 29, 2016 at 5:32 am GMT.

With reference to FIGS. 1 and 4, the server response format 40 may comprise a rules-alert format 41, a Bode plot format 42, a text data format 43, a screenshot format 44, and/or a phone response format 45. For instance, the server response module 54 may communicate with a user device 7 in response to a user query. The server response may take various server response formats 40.

A rules-alert format 41 may comprise a server response, such as a text, graphic, and/or the like sent in response to a detection by the data driven decision module 53 of an anomaly in one or more downlink signal. For instance, a user may set a rule that a rules-alert format 41 server response be sent whenever a particular downlink drops below a particular signal strength, or exceeds a particular bandwidth specification, or otherwise exhibits anomalous behavior. A rules-alert format 41 alert may comprise a text alert, a request for a decision whether to take further action such as activate an uplink facility 9, or an associated response to any complex query format user query, and the like.

A bode plot format 42 may comprise an informational graphic such as a downlink graph 20 (FIG. 2). The Bode plot format 42 may display signal strength over frequency of one or more downlink signal from one or more satellite(s) 2.

A text data format 43 may comprise various data formatted as text strings, such as for display on non-graphical user devices 7. For instance, signal strengths, bandwidths, uptime, center frequencies, modulation type, associated responses to any complex query format user query, and the like may be displayed. Moreover, predefined text strings may be implemented, such as in response to data driven decision module 53 interpreting data regarding downlinks received at antenna(s) 3. For instance, a different message may be sent in response to abnormalities detected in signal strengths, bandwidths, uptime, center frequencies, modulation type and the like. In various embodiments, a text data format 43 comprises machine-readable data, such as to direct a user device 7 comprising an antenna controller.

Furthermore, a server response format 40 may comprise a screenshot format 44. For example, in various embodiments, the receiver(s) 4 comprise demodulators whereby video and/or still images may be decoded from downlink signals. The server 5 may provide such video and/or still images to a user device 7 such as according to a server response format 40 comprising a screenshot format 44. In this manner, users may be assisted in determining whether a manifest system malfunction is caused by problems on an uplink path or on a downlink path of a satellite 2.

Finally, a server response format 40 may comprise a phone response format 45. A phone response format 45 may comprise any data provided from the server 5 to a user device 7 by telephone. For instance, a satellite monitoring system 10 customer service representative may call a user device 7 to verbally report signal strengths, bandwidths, uptime, center frequencies, modulation type, and the like. In further embodiments, an automated system may make such a report, or may transmit data via telephone, such as by a series of tones that may be amplitude modulated, frequency modulated, phase shift keyed, or the like.

Having discussed a satellite monitoring system 10 operating in a satellite communications monitoring scenario 1 and various user query formats 30 and server response formats 40, attention is now directed to FIGS. 6-9 for a discussion of various query and response methods.

Figure 6:
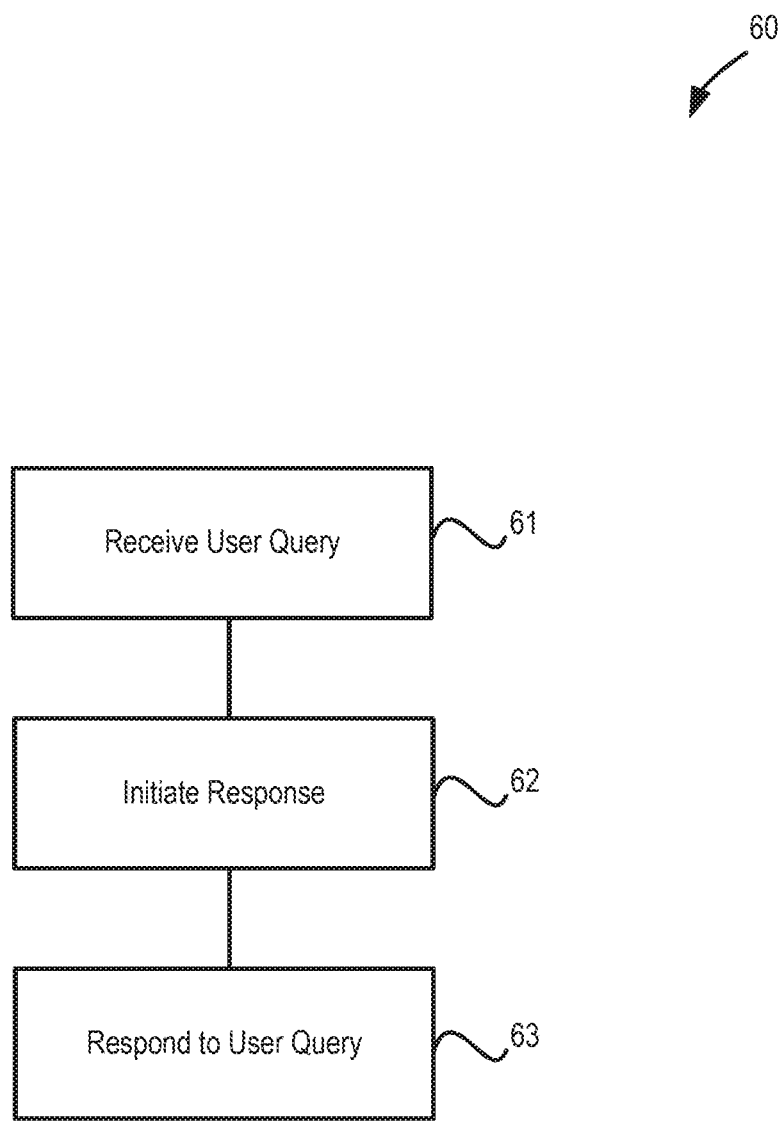
FIG. 6 depicts a query-based communication scenario of a satellite monitoring system, according to various embodiments.

With reference to FIGS. 1 and 6, a query-based communication scenario 60 is disclosed. A satellite monitoring system 10 may receive a user query at a user response module 52 of a server 5 (Step 61). The data driven decision module 53 of the server 5 may initiate a response (Step 62). For example, the data driven decision module 53 may process or may request that the server response module 54 obtain data related to downlinks from satellite(s) 2 at receiver(s) 4 via antenna(s) 3. For further example, the data driven decision module 53 may direct the server response module 54 to instruct antenna(s) 3 to reconfigure such as to change position, polarization, and the like. For still further example, the data driven decision module 53 may direct the database I/O module 51 to retrieve data from the database 8. Moreover, the data driven decision module 53 may direct the server response module 54 to interact with an uplink facility 9, such as to activate or deactivate a particular uplink. Subsequently, the data driven decision module 53 may direct the user response module 52 to transmit a server response to the user, such as to a user device 7 (Step 63).

Figure 7:
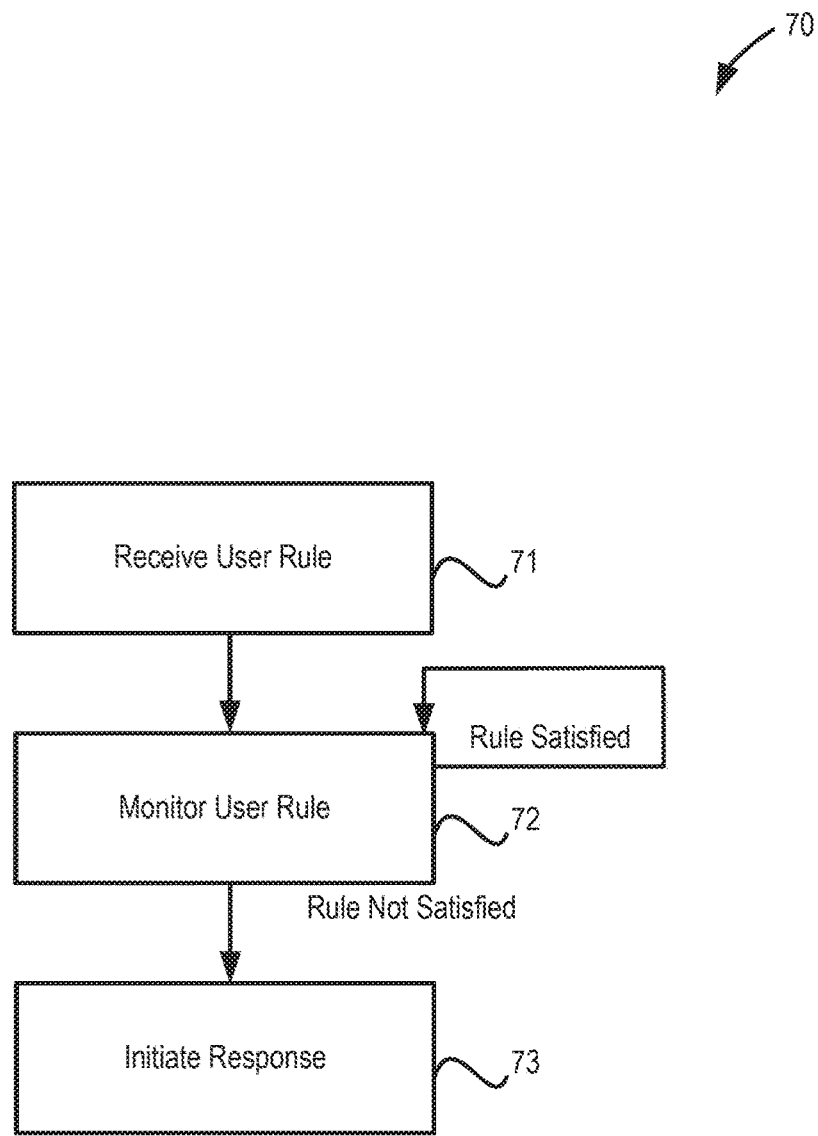
FIG. 7 depicts a rule-based communication scenario of a satellite monitoring system, according to various embodiments.

With reference now to FIGS. 1 and 7, a rules-based communication scenario 70 is disclosed. A satellite monitoring system 10 may receive a user rule at a user response module 52 of a server 5 (Step 71). The data driven decision module 53 of the server 5 may direct the database I/O module 51 to store the rule in a database 8. The data driven decision module 53 may direct the server response module 54 to monitor data related to downlinks from satellite(s) 2 received at receiver(s) 4 via antenna(s) 3 (Step 72). In response to the data conforming to the user rule, the data driven decision module 53 may continue to direct the server response module 54 to monitor the data. However, in response to the data not conforming to the user rule, the data driven decision module 53 may initiate a response (Step 73). For instance, in response to a downlink received at receiver(s) 4 by antenna(s) 3 exhibiting diminished signal strength, the data driven decision module 53 may direct a user response module 52 to transmit a server response to a user device 7 according to a server response format 40 (FIG. 4).

Figure 8A:
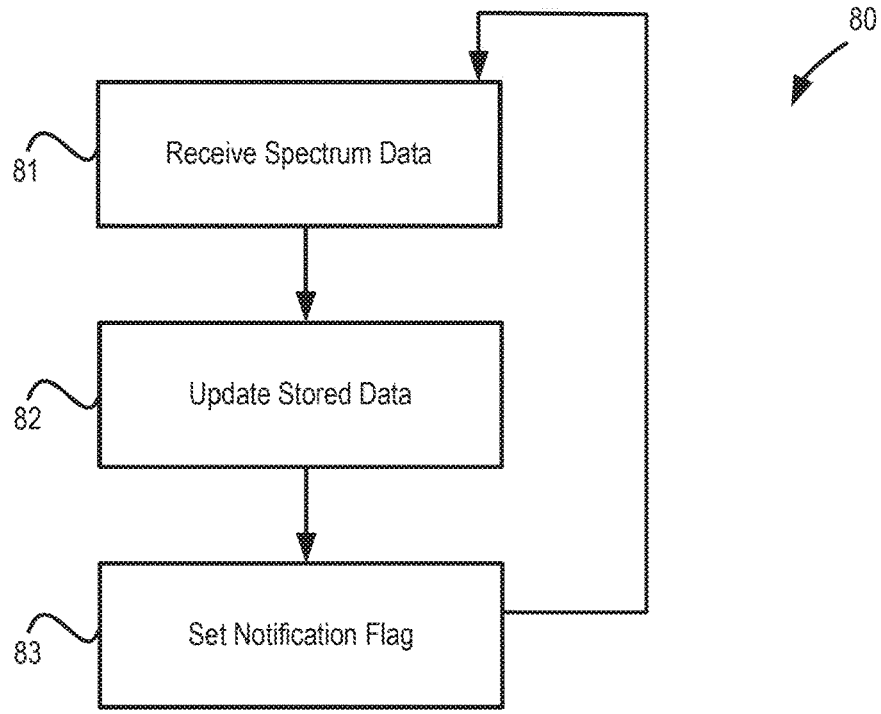
FIG. 8A depicts a hosted chart update scenario of a satellite monitoring system, according to various embodiments.
Figure 8B:
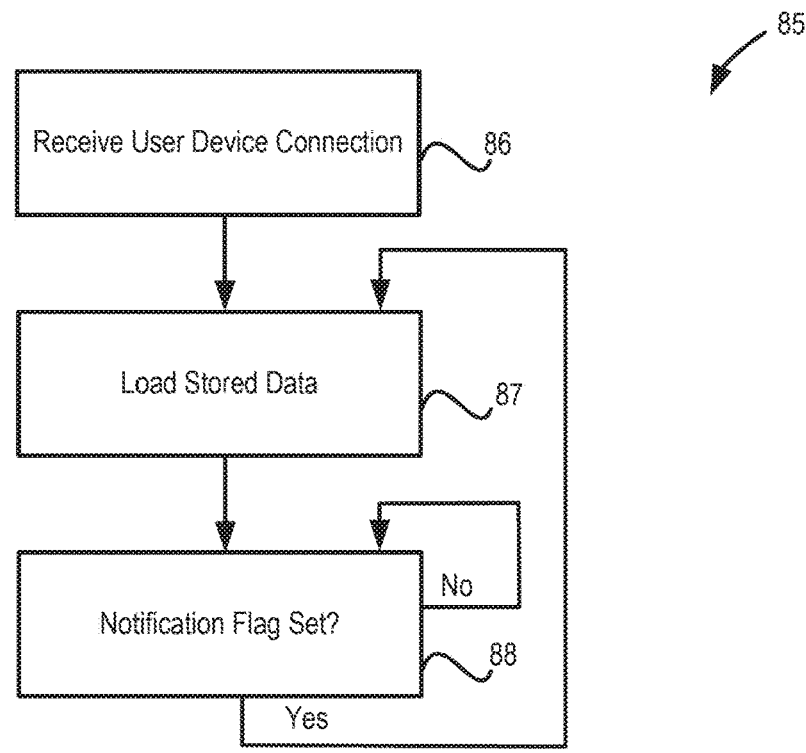
FIG. 8B depicts a hosted chart download scenario of a satellite monitoring system, according to various embodiments.

With reference now to FIGS. 1 and 8A-B, a hosted chart update scenario 80 and a hosted chart download scenario 85 are disclosed. In various embodiments, the satellite monitoring system 10 may periodically collect data regarding satellite 2 downlink(s) and store the data in database 8. A user device 7 may periodically access the database 8 and retrieve the data. In various embodiments, the data may comprise data formatted according to a server response format 40, such as a Bode plot format 42. For instance, a server 5 may receive data regarding satellite 2 downlinks. For instance, the server response module 54 of a server 5 may receive data from receiver(s) 4 representative of characteristics of downlink signals received at antenna(s) 3 from satellite(s) 2 (Step 81). The data driven decision module 53 of the server 5 may direct a database I/O module 51 of the server 5 to store the data in database 8 (Step 82). In various embodiments, database 8 may further comprise a notification flag which may be set or unset by the server response module 54 such as to indicate whether there exists data in the database 8 that has not yet been viewed by a user device 7 (Step 83).

Parallel to the hosted chart update scenario 80, a hosted chart download scenario 85 may also be executed. For example, a user device 7 may connect to the user response module 52 of the server 5 (Step 86). The user device 7 may request that the user response module 52 direct the data driven decision module 53 to further request the database I/O module 51 load data from the database 8 representative of characteristics of satellite 2 downlink(s) (Step 87). Subsequent to the loading, the notification flag of the database 8 may be unset and monitored by the database I/O module 51 of the server 5 (Step 88). In response to the notification flag being set again (see Step 83), the hosted chart download scenario 85 may proceed to Step 87, so that the user device 7 requests the updated data from the database 8 as discussed. In this manner, substantially real-time data may be delivered to the user device 7 according to a server response format 40 (FIG. 4).

Figure 9:
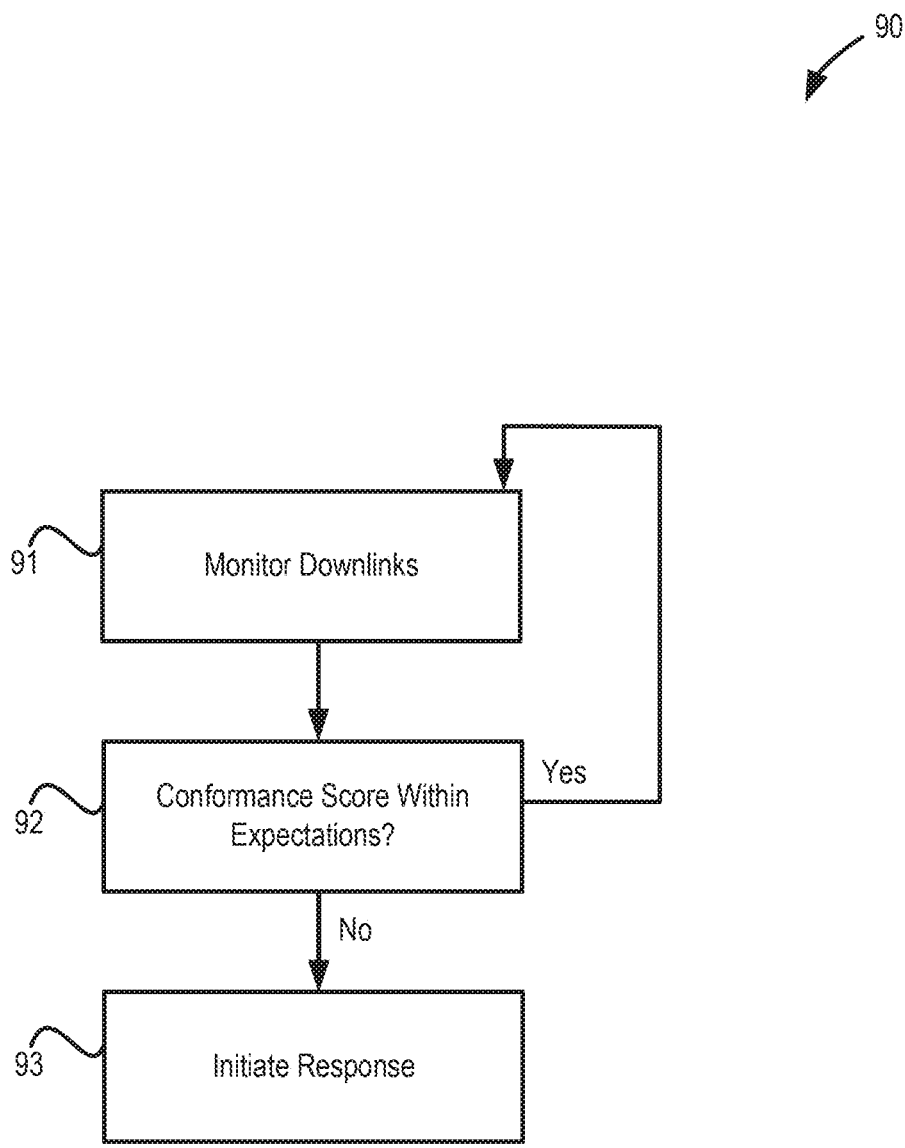
FIG. 9 depicts a query-based communication scenario of a satellite monitoring system, according to various embodiments.

With reference to FIG. 9, an anomaly detection scenario 90 is disclosed. A satellite monitoring system 10 may periodically collect data regarding satellite 2 downlinks and store the data in database 8. The data driven decision module 53 may direct the server response module 54 to monitor data related to downlinks from satellite(s) 2 received at receiver(s) 4 via antenna(s) 3. In further embodiments, the data driven decision module 53 directs the user response module 52 to collect data provided by a user, such as data representing a satellite downlink as received by a user (Step 91). In response to the data conforming to expected characteristics, such as set by user rules, or as determined by machine learning techniques, or processing by the server 5 (e.g., within a range of an typical rolling average value) the data driven decision module 53 may continue to direct the server response module 54 to monitor the data. However, in response to the data not conforming to the expected characteristics, the data driven decision module 53 may initiate a response (Step 92). Stated differently, a "conformance score" of the present data as compared to past data may be computed and evaluated. For instance, in response to a downlink received at receiver(s) 4 by antenna(s) 3 and/or data provided by a user regarding a satellite downlink received by the user exhibiting diminished signal strength, the data driven decision module 53 may direct a user response module 52 to transmit a server response to a user device 7 according to a server response format 40 (FIG. 4). In other words, a user may be notified not just in response to user rules (see FIG. 7, but also in response to automatically determined rules, such as if a downlink varies significantly from average values of such characteristics as center frequency, signal strength, bandwidth, a transfer function of an uplink signal to a downlink signal, a power spectral density, harmonic components, and the like) (Step 93). In further embodiments, the server response to the user device 7 includes instructions to an antenna controller to reorient a user's antenna, such as in response to data provided by a user device 7 not conforming to the expected characteristics and/or the data provided by the receiver(s) 4.

Figure 11:
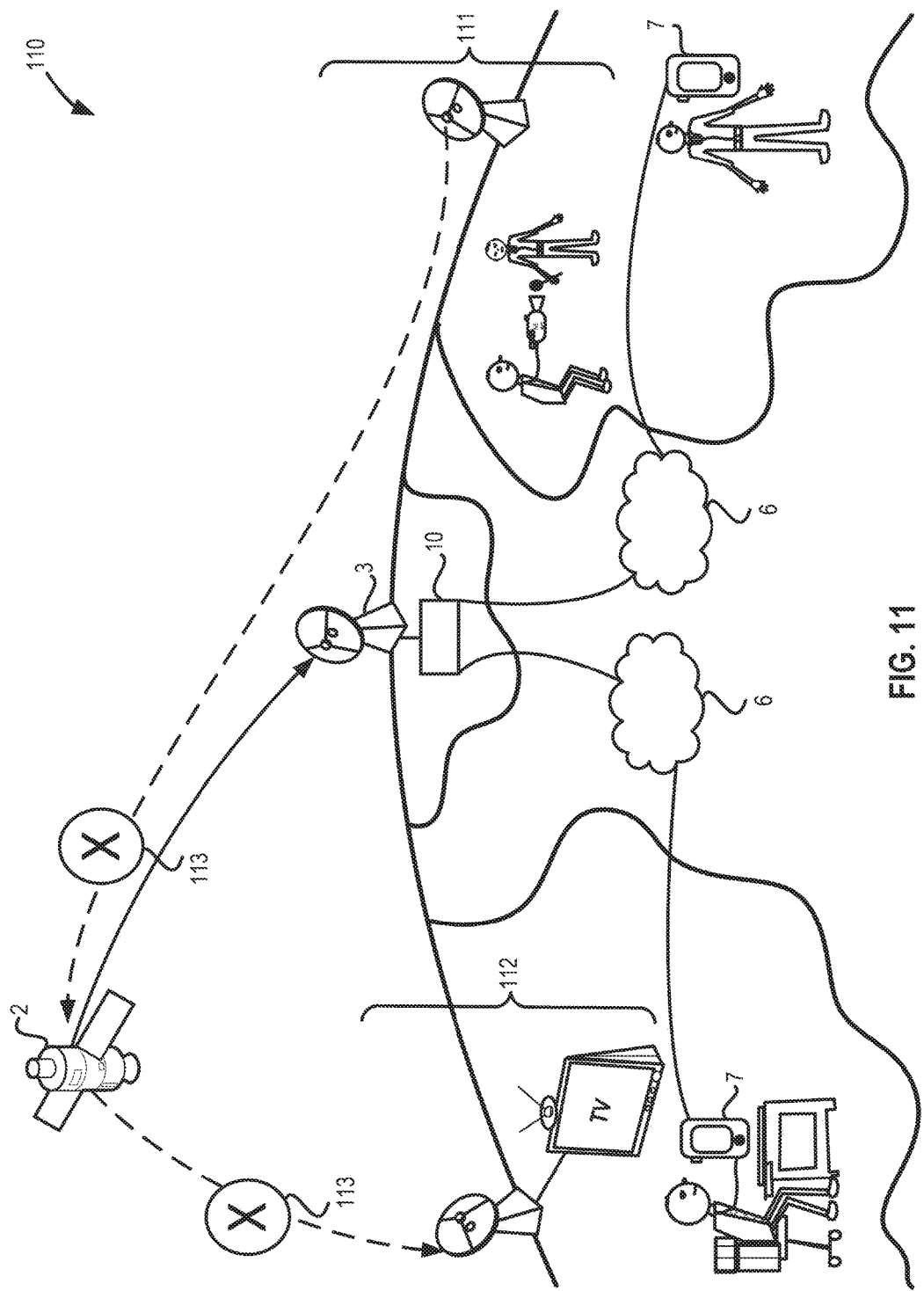
FIG. 11 depicts an example use case of a satellite monitoring system, according to various embodiments.

Finally, with reference to FIGS. 1-10, and particularly, FIG. 11, a use case 110 of a satellite monitoring system 10 operating in a satellite communications monitoring scenario 1 is presented. A user experiencing problems along a satellite signal path may desire to know what portion of the satellite signal path and/or what equipment is involved in the experienced problem. For example, a user may want to know if a downlink signal from satellite has desired characteristics. This information may be helpful in troubleshooting a problem in which a downlink receiver appears to be receiving a downlink signal without desired characteristics. By obtaining third-party verification of the downlink signal characteristics by the satellite monitoring system 10, the user can ascertain whether the problem is in the downlink itself, or in end-point equipment, or elsewhere. Similarly, a user may want to know if an uplink signal to a satellite has desired characteristics, and in various embodiments, may want a backup uplink to be provided to the satellite. For instance, a user may want to determine whether an uplink transmitter or a satellite itself is the cause of problems along a satellite signal path. However, the user may be located geographically remotely from various components of the satellite monitoring system 10 and/or the uplink transmitter and/or the area to which the downlink signal from the satellite is directed. "Geographically remotely" may mean 100 miles away, or 1000 miles away, or on a different continent, or any other distance sufficient that travelling to both of the path end-points requires significant delay so that both end-points cannot be assessed in substantially real time by a traveling technician. In the event that an uplink transmitter is the cause, a backup uplink signal may be desired to be provided. Moreover, a backup uplink signal may be provided as a part of troubleshooting. In various embodiments, the user simply contacts the satellite monitoring system 10 provider and requests that a satellite monitoring system provider employee, such as a customer service representative, perform troubleshooting and/or diagnostics.

Thus, a use case 110 may comprise an uplink customer situation 111, a downlink customer situation 112, and a downlink interruption 113. For instance, an uplink customer situation 111 may include an uplink provider conducting a television broadcast and uplinking the broadcast to a satellite 2 for remote downlink. A downlink customer situation 112 may comprise a remotely disposed television viewer seeking to view the broadcast. A downlink interruption 113 may comprise an equipment malfunction which prevents the downlink signal from reaching the remotely disposed television viewer. A downlink interruption 113 may exist anywhere in the signal path, such as an uplink, a downlink, a satellite 2, or various other equipment, such as at path endpoints.

In various embodiments, a satellite monitoring system 10 may provide one or more antenna 3 whereby the presence or absence of a downlink signal may be verified by the satellite monitoring system 10. The satellite monitoring system 10 may communicate via a network 6 with a user device 7 operated by a user located at the downlink end of the satellite path, such as near the remotely disposed television user, and also communicate via a network 6 with a user device 7 operated by a user located at the uplink end of the satellite path, such as near the origin of the television broadcast. In this manner, a technician troubleshooting the television broadcast receiver, and/or an executive of the broadcast uplink provider may separately monitor the characteristics of the downlink signal as received at antenna(s) 3. In this manner, user devices 7 at geographically dispersed locations may receive helpful data in determining how to correct downlink interruptions 113. For instance, a user device 7 of the broadcast uplink provider may receive a server response formatted according to a server response format 40 comprising a rules-alert format 41. For instance, an emergency alert may be transmitted to the user device 7 of an executive alerting the executive to broadcast problems, and/or an uplink facility 9 may immediately be started.

Similarly, a user device 7 of a technician troubleshooting the television broadcast receiver may receive a server response formatted according to a server response format 40 comprising a Bode plot format 42. For instance, the technician may compare the signal strength of a downlink as indicated by the Bode plot format 42 data, with the signal strength of a downlink as received by a separate television broadcast receiver, to determine whether the downlink interruption 113 is due to local errors, such as a faulty television broadcast receiver, or other errors, such as due to a satellite 2 malfunction.

Accordingly, various aspects of the satellite monitoring system 10 may be remotely dispersed. While a technician may troubleshoot problems locally, with locally available equipment, a technician would lack the ability to control remotely dispersed troubleshooting hardware dispersed along both endpoints of the satellite path as well as at independent locations. As such, the satellite monitoring system 10 provides a technician with the ability to control remotely dispersed troubleshooting hardware dispersed along both endpoints of the satellite path and/or at independent locations. In this manner, a technician may troubleshoot both local and remote aspects of a uplink customer situation 111, a downlink customer situation 112, a downlink interruption 113 and the like, in near real-time and from a single physical location.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general-purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor;

and a plurality of databases. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory ("RAM"), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory ("EPROM"), or programmable read only memory ("PROM")) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association ("PCMCIA") slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency ("RF") link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits ("ASICs"). Implementation of the hardware state machine so as to perform the functions described herein will be apparent to persons skilled in the relevant art(s).

A web client and/or interface device includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale ("POS") devices and/or terminals, televisions, or any other device capable of receiving data over a network. A webclient may run Microsoft Internet Explorer®, Mozilla Firefox®, Google® Chrome, Apple® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps ("apps"). Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or communications (e.g., electronic) system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, offline communications, wireless communications, transponder communications, local area network ("LAN"), wide area network ("WAN"), virtual private network ("VPN"), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g., IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider ("ISP") over the local loop as is typically used in connection with standard modem communication, cable modem, Dish Networks®, ISDN, Digital Subscriber Line ("DSL"), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television ("ITV") network. Moreover, the system contemplates the use, sale or distribution of any items, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited May 2014), which is hereby incorporated by reference in its entirety. While various aspects of the disclosure herein, such as network 6 (FIG. 1) may incorporate cloud computing, in further embodiments, various aspects may not incorporate cloud computing, depending on desired characteristics, data integrity, security concerns, etc.

As used herein, "transmit" may include sending electronic data from one system component to another over a network connection. Additionally, as used herein, "data" may include encompassing information such as commands, queries, files, data for storage, and the like in digital or any other form.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG ("GnuPG"), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server ("IIS"), Microsoft Transaction Server ("MTS"), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object ("ADO") compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages ("ASP"), common gateway interface scripts ("CGI"), extensible markup language ("XML"), dynamic HTML, cascading style sheets ("CSS"), AJAX ("Asynchronous Javascript And XML"), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQ™ (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

Exemplary Embodiments

A method of satellite monitoring may include the steps of receiving a user query, initiating a response comprising requesting that a server response module of the server obtain data related to a downlink from a satellite, and directing a user response module of the server to transmit a server response. The user query may be received from a user device located geographically remotely from the server.

An article of manufacture may include a non-transitory, tangible computer readable storage medium having instructions stored thereon that, in response to execution by a user device, cause the user device to perform operations. The operations may include steps of a method of satellite monitoring such as transmitting a user query comprising an instruction to a server. The instruction may include at least one of a satellite identifier, a center frequency query, or a polarization query with the instruction is associated with a satellite. The steps may also include receiving a server response having a server response format comprising characteristics of a downlink signal. The characteristics of the downlink signal may comprise at least one of a bandwidth, a polarization, a center frequency, an amplitude, a power spectral density, or a harmonic component.

In various embodiments, the characteristics of the downlink signal may comprise the bandwidth, the polarization, the center frequency, and the amplitude. The server response may be transmitted from a server to the user device with the user device located geographically remotely from the server. An antenna is configured to receive the downlink signal from a satellite. A receiver may include a spectrum analyzer logically connected to the antenna. The server may comprise a data driven decision module configured to assess the characteristics of the downlink signal. The user query may also include a user rule. The user device may comprise an antenna controller. The steps may further comprise receiving instructions to reorient an antenna and/or transmitting data collected by a received in logical communication with the user device with the data representing a signal from the satellite.

What is claimed is:

1. A decentralized spectrum analysis system, comprising:
   at least one spectrum analyzer configured to process signals received from satellites; and
   a server coupled to the at least one spectrum analyzer and configured to:
      receive a first user query from a first user device requesting first characteristics of a first satellite downlink signal received via a first antenna,
      receive a second user query from a second user device requesting second characteristics of a second satellite downlink signal received via a second antenna,
      receive satellite data corresponding to the first characteristics and the second characteristics from the at least one spectrum analyzer;
      processing the satellite data to identify the first characteristics and the second characteristics,
      transmit a first server response to the first user device that includes the first characteristics and transmit a second server response to the second user device that includes the second characteristics in substantially real time, the first characteristics differing from the second characteristics in at least one of a spectrum, a center frequency, a polarity, a satellite location, or a satellite identifier.

2. The decentralized spectrum analysis system of claim 1, wherein the first user query and the second user query each include at least one of a satellite identifier query, a center frequency query, or a polarization query.

3. The decentralized spectrum analysis system of claim 1, wherein the first characteristics and the second characteristics each include at least one of the spectrum, the center frequency, the polarity, the satellite location, the satellite identifier, a bandwidth, an amplitude, a power spectral density, a signal strength, a transfer function, or a harmonic component.

4. The decentralized spectrum analysis system of claim 1, wherein the server is configured to continuously transmit the first server response and the second server response to the first user device and the second user device, respectively.

5. The decentralized spectrum analysis system of claim 1, wherein the first antenna and the second antenna are located in different geographical areas.

6. The decentralized spectrum analysis system of claim 1, wherein:
   the at least one spectrum analyzer includes a first spectrum analyzer and a second spectrum analyzer;

the server is configured to receive the satellite data corresponding to the first characteristics from the first spectrum analyzer; and the server is configured to receive the satellite data corresponding to the second characteristics from the second spectrum analyzer.

7. The decentralized spectrum analysis system of claim 1, wherein:

the first user device includes the first antenna and an antenna controller configured to reorient the first antenna; and the server is further configured to transmit instructions to the antenna controller of the first user device to reorient the first antenna.

8. The decentralized spectrum analysis system of claim 1, wherein the server is configured to periodically receive first satellite data corresponding to the first characteristics from the at least one spectrum analyzer and to periodically receive second satellite data corresponding to the second characteristics from the at least one spectrum analyzer.

9. A decentralized spectrum analysis system, comprising:

at least one spectrum analyzer configured to process signals received from satellites; and a server coupled to the at least one spectrum analyzer and configured to:

receive a first user query from a first user device requesting first characteristics of a first satellite downlink signal received via a first antenna, receive a second user query from a second user device requesting second characteristics of a second satellite downlink signal received via a second antenna, periodically collect data regarding the first satellite downlink signal and the second satellite downlink signal, process the collected data to identify the first characteristics and the second characteristics, and transmit a first server response to the first user device that includes the first characteristics and transmit a second server response to the second user device that includes the second characteristics in substantially real time.

10. The decentralized spectrum analysis system of claim 9, wherein the first user query and the second user query each include at least one of a satellite identifier query, a center frequency query, or a polarization query.

11. The decentralized spectrum analysis system of claim 9, wherein the first characteristics and the second characteristics each include at least one of a spectrum, a center frequency, a polarity, a satellite location, a satellite identifier, a bandwidth, an amplitude, a power spectral density, a signal strength, a transfer function, or a harmonic component.

12. The decentralized spectrum analysis system of claim 9, wherein the first characteristics differ from the second characteristics in at least one of a spectrum, a center frequency, a polarity, a satellite location, or a satellite identifier.

13. A decentralized spectrum analysis system, comprising:

at least one spectrum analyzer configured to process signals received from satellites; and a server coupled to the at least one spectrum analyzer and configured to:

receive a first user query from a user device requesting first characteristics of a first satellite downlink signal received from a first satellite, receive a second user query from the user device requesting second characteristics of a second satellite downlink signal received from a second satellite that is different than the first satellite, communicate with the at least one spectrum analyzer to identify the first characteristics and the second characteristics, and transmit a first server response to the user device including the first characteristics and transmit a second server response to the user device including the second characteristics in substantially real time.

14. The decentralized spectrum analysis system of claim 13, wherein the first user query and the second user query each include at least one of a satellite identifier query, a center frequency query, or a polarization query.

15. The decentralized spectrum analysis system of claim 13, wherein the first characteristics and the second characteristics each include at least one of a spectrum, a center frequency, a polarity, a satellite location, a satellite identifier, a bandwidth, an amplitude, a power spectral density, a signal strength, a transfer function, or a harmonic component.

16. The decentralized spectrum analysis system of claim 13, wherein:

the at least one spectrum analyzer includes a first spectrum analyzer and a second spectrum analyzer;

the server is configured to communicate with the first spectrum analyzer to identify the first characteristics; and the server is configured to communicate with the second spectrum analyzer to identify the second characteristics.

17. The decentralized spectrum analysis system of claim 13, wherein:

the user device includes an antenna and an antenna controller configured to reorient the antenna; and the server is further configured to transmit instructions to the antenna controller of the user device to reorient the antenna.

18. The decentralized spectrum analysis system of claim 13, further comprising an antenna configured to receive at least one of the first satellite downlink signal or the second satellite downlink signal.

19. The decentralized spectrum analysis system of claim 13, wherein at least one of the first user query or the second user query includes a request to be notified of a detected anomaly in the first satellite downlink signal or the second satellite downlink signal, respectively.

20. The decentralized spectrum analysis system of claim 19, wherein at least one of the first server response or the second server response is provided in response to detection of the detected anomaly and includes the detected anomaly.

* * * * *